United States Patent
Putscher et al.

[15] 3,665,829
[45] May 30, 1972

[54] CONTAINER FOR PHOTOGRAPHIC FILM

[72] Inventors: Johann Putscher, Munich; Josef Gersch, Unterhaching; Otto Wiedemann, Starnberg; Alfred Winkler, Munich, all of Germany

[73] Assignee: Agfa-Gevaert Aktiengesellschaft, Leverkusen, Germany

[22] Filed: June 12, 1970

[21] Appl. No.: 45,874

[30] Foreign Application Priority Data

June 19, 1969 Germany......................P 19 31 117.2
Aug. 13, 1969 Germany......................P 19 41 101.9

[52] U.S. Cl.......................................................95/31 CA
[51] Int. Cl..................G03b 1/48, G03b 17/26, G03b 19/04
[58] Field of Search.......................................95/31 R, 31 CA

[56] References Cited

UNITED STATES PATENTS

| | | |
|---|---|---|
| 3,347,142 | 10/1967 | Steisslinger..............................95/31 R |
| 3,103,861 | 9/1963 | Koeppe.....................................95/31 R |
| 3,490,350 | 1/1970 | Hardies et al............................95/31 R |

*Primary Examiner*—Joseph F. Peters, Jr.
*Attorney*—Michael S. Striker

[57] ABSTRACT

A container for photographic film has a hollow web connecting a film-supplying chamber with a film-collecting chamber. The front wall of the web has a window which exposes one film frame at a time and such frame is held at a fixed distance from the picture-taking objective of the camera by locating surfaces provided on pins forming part of the rear wall of the web or of a plate which is mounted in the web behind the exposed film frame. The pins extend through openings of the front wall of the web and abut against a stop in the camera body. The plate is biased forwardly by springs installed in a recess of the rear wall and has legs which engage abutments of the front wall to arrest the plate in its foremost position when the container is withdrawn from the camera body.

7 Claims, 5 Drawing Figures

Patented May 30, 1972 3,665,829

INVENTOR
JOHANN PUTSCHER
JOSEF GERSCH
OTTO WIEDEMANN
ALFRED WINKLER

INVENTOR
JOHANN PUTSCHER
JOSEF GERSCH
OTTO WIEDEMANN
ALFRED WINKLER

CONTAINER FOR PHOTOGRAPHIC FILM

BACKGROUND OF THE INVENTION

The present invention relates to improvements in containers or cassettes for photographic film. More particularly, the invention relates to improvements in containers of the type wherein the film is transported from a first chamber into a second chamber and through a hollow intermediate portion or web which is provided with a window for exposure of successive film frames to scene light.

Presently known containers of the just outlined character normally consist of synthetic plastic material and their parts are welded to each other. The intermediate portion includes a rear wall against which the film frame behind the window abuts and a front wall which is formed with the window and is welded to the rear wall. Such welding invariably causes at least some distortion of the container and thus affects the distance between the film frame behind the window and the objective of the photographic apparatus wherein the container is put to use.

If the container is to be used in an inexpensive camera which does not have a frame counter, the film is inserted into the container with a protective paper strip and the rear wall of the intermediate portion is provided with an opening permitting observation of numerals applied to the protective strip and indicating different numbers of exposed or unexposed film frames. When the container is loaded with film which is protected by a strip of paper, the number of film frames normally does not exceed twenty because the protective strip occupies a substantial amount of space in the interior of the container.

SUMMARY OF THE INVENTION

One object of the invention is to provide a container or cassette for photographic roll film wherein the film frame which is to be exposed to scene light is invariably positioned at a predetermined distance from the picture taking objective regardless of eventual inaccuracies in the manufacturing of the container.

Another object of the invention is to provide a container wherein the pressure plate for the film frame which is to be exposed to scene light is constructed and mounted in a novel way.

A further object of the invention is to provide a container wherein deformations which normally develop in response to welding of the sections of the container shell to each other cannot influence the distance between the film frame to be exposed and the picture-taking objective when the container is properly installed in a photographic apparatus.

An additional object of the invention is to provide a container which exhibits the above-outlined novel features and is capable of being used in presently known cameras.

Still another object of the invention is to provide a container wherein the film need not be protected by a strip of paper or the like and which embodies a novel and improved frame counter mounted in such a way that light cannot reach the film excepting by way of the objective in the course of an exposure.

A further object of the invention is to provide a container wherein the film behind the light-admitting window in the intermediate portion of the container is guided with a high degree of accuracy and wherein the means for guiding the film performs additional advantageous and novel functions.

The invention resides in the provision of a container for photographic film which is to be used in photographic apparatus of the type having a body including a stop portion located at a predetermined distance from the picture-taking objective.

In accordance with one feature of the invention, the container comprises a film-supplying first portion, a film-collecting second portion, and a hollow intermediate portion which connects the first and second portions and defines a channel wherein the film can be transported stepwise from the first into the second portion. The intermediate portion comprises a front wall provided with a window which exposes one frame of the film in the channel and the container further comprises a film-guiding plate movably installed in the intermediate portion rearwardly of the film frame behind the window and biasing means for urging the plate forwardly into abutment with the film. The plate has a plurality of locating surfaces which bear, under the action of the biasing means, against the stop portion in the body of the photographic apparatus wherein the container is installed so that the film frame behind the window is held at a fixed distance from the objective.

The novel features which are considered as characteristic of the invention are set forth in particular in the appended claims. The improved container itself, however, both as to its construction and the mode of assembling and utilizing the same, together with additional features and advantages thereof, will be best understood upon perusal of the following detailed description of certain specific embodiments with reference to the accompanying drawing.

DESCRIPTION OF THE PREFERRED EMBODIMENTS

Figure 1:
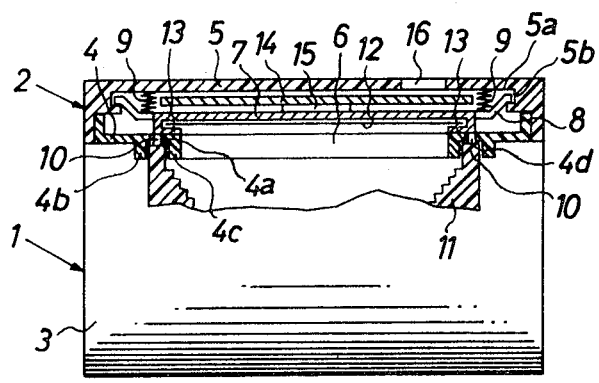
FIG. 1 is an enlarged transverse sectional view of a container which embodies one form of the invention.

Referring first to FIG. 1, there is shown a portion of a container or cassette 1 which comprises a film-supplying first portion or chamber 3 containing a supply of unexposed photographic film, a film-collecting second portion (not shown) which contains exposed film and is preferably similar and mirror symmetrical to the first portion 3, and a hollow intermediate portion or web 2 which connects the first and second portions and defines a channel wherein the film can travel from the portion 3 into the second portion.

The intermediate portion 2 comprises a frame-like front wall 4 which is integral with parts of the first and second portions and a rear wall 5 which is integral with the remaining parts of the first and second portions. The front wall 4 is formed with a window 6 which can expose to scene light one film frame at a time. The window 6 is defined by forwardly extending ledges or frame members 4c which, in turn, are surrounded by ledges or frame members 4b of the front wall 4.

Figure 2:
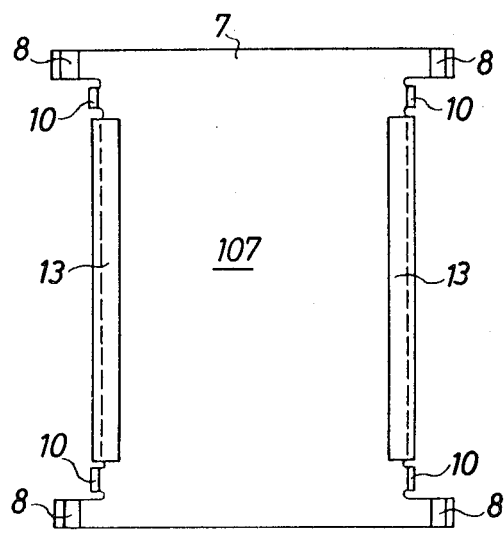
FIG. 2 is a plan view of the film guiding plate in the container of FIG. 1.

An H-shaped film guiding plate 7, best shown in FIG. 2, is installed between the front wall 4 and the rear wall 5. The plate 7 is provided with four rearwardly inclined portions or legs 8 which are received in guide grooves 5b extending laterally from a recess or depression 5a in the rear wall 5. The recess 5a accommodates helical springs 9 which bias the plate 7 forwardly so that the tips of the bent-over portions 8 bear against abutments provided on the rear wall 5 in front of the grooves 5b. These abutments limit the extent of forward movement of the plate 7 when the container 1 is not inserted into a photographic apparatus.

The film-guiding plate 7 is further provided with two pairs of forwardly extending portions or legs 10 each of which is adjacent to one of the legs 8 and which extend forwardly through openings 4d provided in the surface 4a of the front wall. The legs 10 serve as followers and have front surfaces or locating surfaces which engage with a stop portion 11 of the camera body when the container 1 is properly inserted into the photographic apparatus.

The film-guiding plate 7 further includes two elongated edge portions 13 which are parallel to the direction of travel of film 12 between the first and second portions of the container 1. The main or central portion 107 of the plate 7 forms with the edge portions 13 a substantially U-shaped trough wherein the film 12 advances behind the window 6. The edge portions 13 flank the marginal portions of the film frame behind the window 6 and they overlie the central portion 107.

As shown in FIG. 1, the helical springs 9 react against the rear wall 5, and these springs urge the locating surfaces on the legs 10 of the plate 7 against the stop portion 11 of the camera body. Thus, the length of the legs 10 determines the distance between the front side of the central or main portion 107 and the stop portion 11. The film 12 abuts against the front side of the main portion 107 and is therefore located at an accurately determined (fixed) distance from the picture-taking objective in the camera body. The accuracy of finish and/or assembling of the parts of the container 1 does not affect the distance between the plane of the film frame behind the window 6 and the objective, as long as the locating surfaces of legs 10 on the plate 7 abut against the stop portion 11. The springs 9 insure that the legs 10 bear against the stop portion 11 as soon as the container 1 is properly inserted into the camera body. Since the plate 7 need not be welded to the casing or shell of the container 1, it is not likely to undergo any appreciable deformation during assembly of the front wall 4 with the rear wall 5. The walls 4, 5 are normally welded to each other, and such welding is likely to cause at least some distortion which, however, does not affect the plate 7 and its cooperation with the stop portion 11 to maintain the frame of film 12 behind the window 6 (in front of the main portion 107) at an accurately determined fixed distance from the objective when the locating surfaces of the legs 10 abut against the stop portion 11.

When the container 1 is not installed in a camera, the springs 9 maintain the plate 7 in a foremost position in which the legs 8 engage abutments in front of the respective grooves 5b.

If the roll film 12 in the improved container 1 is one which is not protected by a strip of paper or the like, and if the container is to be used in a camera which does not embody a frame counter, the frame counter can be installed in the portion 2. This frame counter may comprise a counter wheel 14 which is received in the space between the rear wall 5 and the plate 7 and is mounted on a shaft 15 which is supported by the plate 7. The rear wall 5 has an aperture 16 which permits observation of numerals applied to the rear side of the wheel 14 and indicating various numbers of exposed or unexposed film frames in the container 1. The exact manner in which the wheel 14 is rotated in response to lengthwise transport of the film 12 forms no part of the present invention. For example, the wheel 14 can be provided with teeth (not shown) which enter the perforations in the film 12. The manner in which the film 12 is transported lengthwise in response to rotation of the core of the takeup reel in the second portion of the container 1 is also known in the art and need not be described here. A frame counter which can be used in the container of FIGS. 1 and 2 is disclosed in German Utility Model No. 6,753,703.

Figure 3:
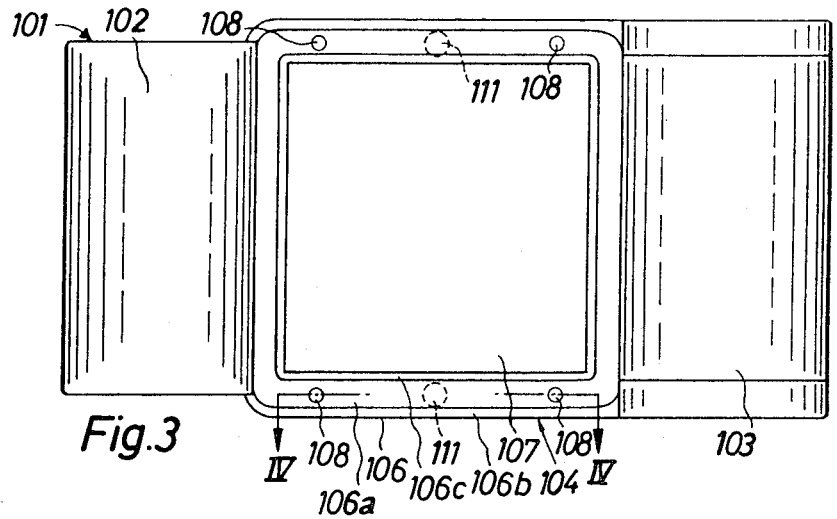
FIG. 3 is a plan view of a second container.
Figure 4:
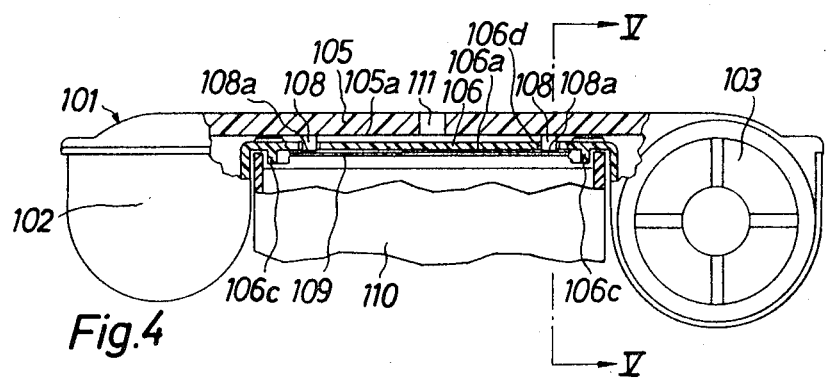
FIG. 4 is a partly elevational and partly sectional view of the second container, the section being taken along the line IV—IV of FIG. 3.
Figure 5:
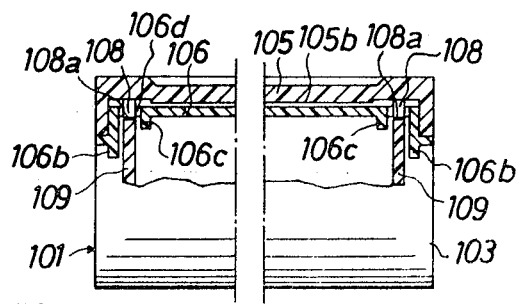
FIG. 5 is a sectional view as seen in the direction of arrows from the line V—V of FIG. 4.

Referring now to FIGS. 3-5, there is shown a second container 101 which includes a film-supplying first portion or chamber 102, a film-collecting second portion or chamber 103, and a hollow intermediate portion or web 104 which connects the portions 102, 103 with each other and defines a narrow channel for photographic film. The intermediate portion 104 includes a rear wall 105 which is integral with parts of the chambers 102, 103, and a frame-like front wall 106 portions of which are also integral with the chambers 102, 103. The walls 105, 106 are welded to each other. The front wall 106 is formed with a window 107 and has a rectangular front surface 106a surrounding the entire window 107 and being in turn surrounded by forwardly extending frame members or ledges 106b, 106c of the front wall 106. The front surface 105a of the rear wall 105 has a portion 105b serving as an abutment for that film frame which is located behind the window 107. The surface 105a is provided with at least three, preferably four forwardly extending projections or pins 108 two of which are adjacent to one marginal portion and the other two of which are adjacent to the other marginal portion of the film frame behind the window 107. These pins 108 are adjacent to the surface portion 105b. The front wall 106 is formed with openings 106d which are provided in the surface 106a and permit passage of the pins 108. The locating surfaces or front surfaces 108a of the pins 108 abut against a stop portion 109 which forms part of the camera body 110 and is located at a predetermined distance from the picture-taking objective. Thus, the film frame which abuts against the surface portion 105b of the rear wall 105 is located at a fixed distance from the objective as soon as the container 101 is properly inserted into the body 110 so that the locating surfaces 108a of the pins 108 bear against the stop portion 109, provided that the distance between the surface portion 105b and the locating surfaces 108a is selected with a reasonable degree of precision. This presents no serious problems in the manufacture and assembly of the container 101.

It will be seen that the distance between the film frame behind the window 107 and the objective of the camera is determined exclusively by the rear wall 105 of the intermediate portion 104, i.e., by the pins 108 which are integral with and form part of the rear wall 105. The distance between such film frame and the objective is a function of the distance between the locating surfaces 108a and the surface portion 105b. Welding of the front wall 106 to the rear wall 105 does not unduly influence the distance between the surface portion 105b and the locating surfaces 108a.

The locating surfaces 108a are preferably coplanar with the front surface 106a of the front wall 106, i.e., the distance between the locating surfaces 108a and the surface portion 105b is the same as the distance between the surface 106a and the surface portion 105b. This is achieved by utilizing a welding machine having mandrels extending through at least two holes 111 provided therefor in the rear wall 105 and serving to bias the front surface 106a against an anvil which serves as a stop for the locating surfaces 108a during welding of the front wall 106 to the rear wall 105. The illustrated holes 111 are provided in the rear wall 105 behind the adjacent portions of the front surface 106a and each thereof is located between two pins 108. It will be seen that, during welding of the walls 105, 106 to each other, the surface 106a abuts against the same stop surface which serves as an abutment for the locating surfaces 108a on the pins 108 so that the surfaces 108a are invariably located in the plane of the surface 106a when the welding of the front wall 106 to the rear wall 105 is completed. Therefore, the stop portion 109 lies flush against the surfaces 106a and 108a when the container 101 is properly inserted into the camera body 110.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended

1. For use in a photographic apparatus having a body including a stop portion located at a predetermined distance from the picture-taking objective, a container for photographic film comprising a film-supplying first portion; a film-collecting second portion; a hollow intermediate portion connecting said first and second portions and having a front wall provided with a window arranged to expose a portion of the film in said intermediate portion, said front wall having a plurality of openings adjacent to said windows; a film-guiding plate movably received in said intermediate portion rearwardly of the film frame behind said window, said plate comprising projections extending forwardly through said openings and having at their front ends locating surfaces; and biasing means reacting against one of said container portions and arranged to urge said plate forwardly so that said locating surfaces of said projections abut, under the action of said biasing means, against the stop portion in the body of the photographic apparatus wherein the container is installed whereby the film frame behind said window is held at a fixed distance from the objective.

2. A container as defined in claim 1, wherein said intermediate portion further comprises a rear wall having a depression which receives said plate, said biasing means being arranged to move said plate forwardly in a direction at right angles to the plane of the film behind said window.

3. A container as defined in claim 1, wherein said plate further comprises longitudinally extending edge portions adjacent to the marginal portions of the film behind said window.

4. A container as defined in claim 3, wherein said plate further comprises a main portion located between and defining with said edge portions a shallow trough for the film behind said window.

5. A container as defined in claim 1, wherein said projections are adjacent to the marginal portions of the film behind said window.

6. A container as defined in claim 1, wherein said intermediate portion comprises abutment means for limiting the extent of forward movement of said plate under the action of said biasing means when the container is withdrawn from the apparatus.

7. A container as defined in claim 1, wherein said first and second portions are substantially mirror symmetrical with reference to each other and said plate is an H-shaped element having and rearwardly extending legs engaging abutment means provided in said intermediate portion to limit the extent of forward movement of the plate when the container is removed from the photographic apparatus.

* * * * *